DATA STORAGE ARRANGEMENTS

Filed March 13, 1961 2 Sheets-Sheet 1

Inventors
Tom Kilburn
David Beverly George Edwards
By Cushman, Darby & Cushman
Attorneys

DATA STORAGE ARRANGEMENTS

Filed March 13, 1961 2 Sheets-Sheet 2

Inventors
Tom Kilburn
David Beverley George Edwards
By Cushman, Darby & Cushman
Attorneys 3,231,361
DATA STORAGE ARRANGEMENTS
Tom Kilburn, Urmston, and David Beverley George Edwards, Manchester, England, assignors, by mesne assignments, to International Business Machines Corporation, New York, N.Y., a corporation of New York
Filed Mar. 13, 1961, Ser. No. 95,381
Claims priority, application Great Britain, Mar. 16, 1960, 9,301/60
3 Claims. (Cl. 340—174)

Figure 1:
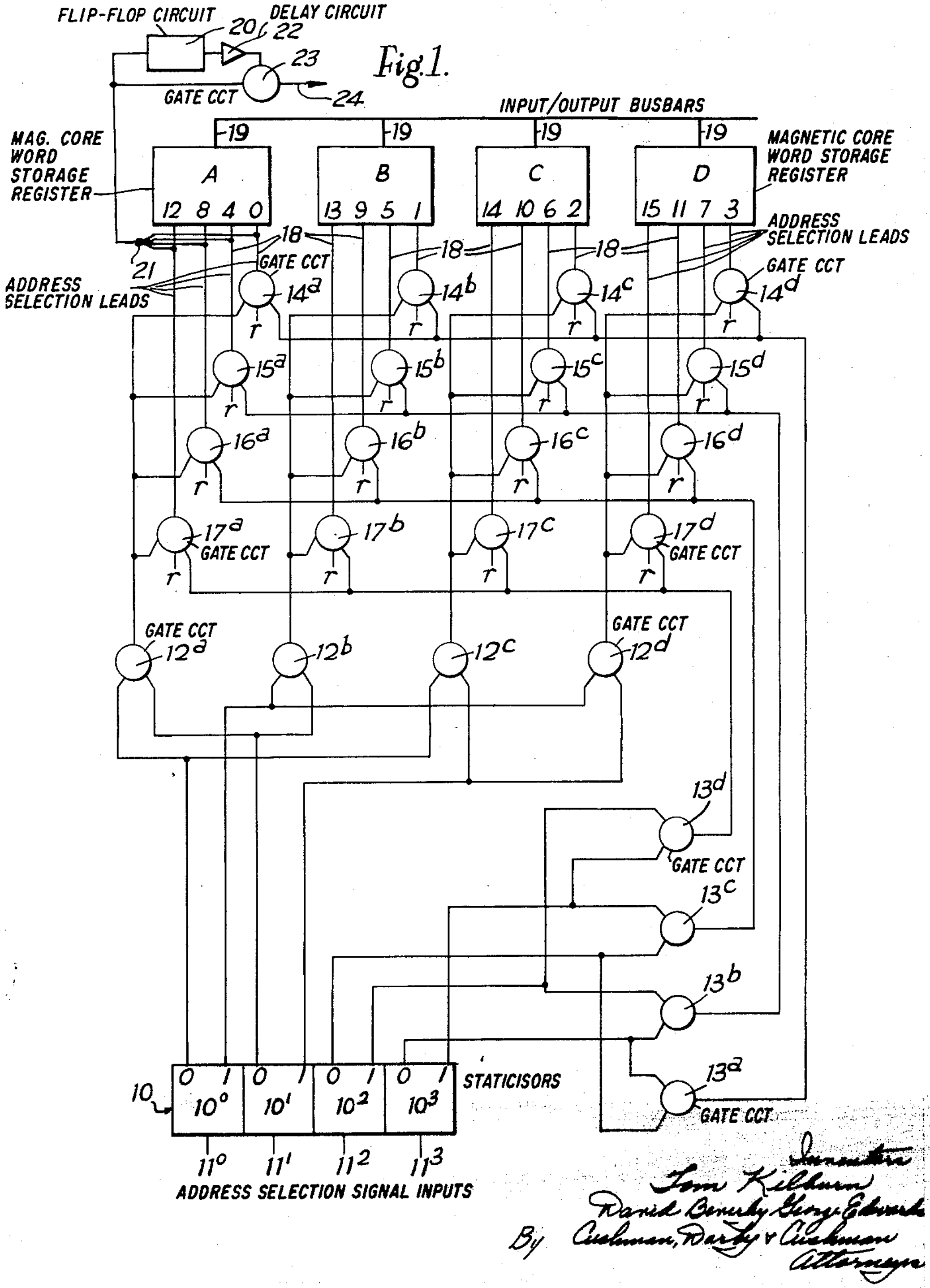

This invention relates to data storage arrangements for electronic digital computing machines and the like and is more particularly concerned with storage arrangements providing a large number of separate word storage locations or addresses which are immediately accessible on demand by an appropriate address signal and which include as storage means devices which become immobilised for a predetermined period of time after being subjected to a reading or writing operation. The invention is particularly, although not exclusively, concerned with data storage arrangements comprising a large number of magnetic storage cores or similar remanent induction type devices arranged in matrix form.

It is well known that a magnetic core type storage device comprising a large number of separate storage cores arranged in matrix form for the registering of a plurality of multi-digit data words in an electronic digital computing machine is subject to a limitation of the speed of successive usage for either reading therefrom or writing thereinto. For example, although an actual reading or writing operation involving a particular group of cores of the matrix block which form the storage location for one data word may be effected in, say, 0.5 microsecond, the whole of such matrix block including all of the remaining cores forming the storage locations for a large number of other data words becomes effectively immobilised for a considerably longer period, say, 2 microseconds. In the case of high speed machines which are capable of effecting arithmetic operations in, say 1 microsecond, this delay or immobilisation period can result in considerable and unnecessary operational delay particularly when, as is frequently the case in practice, successive order words of the order programme are located in sequentially numbered addresses and/or the data or number words called for by successive orders are likewise located in sequentially numbered addresses.

An object of the present invention is to provide an improved arrangement by which the effect of such delay or immobilisation time may be largely avoided.

In accordance with the invention, the data storage device comprises a plurality of physically separate blocks or matrices of storage elements, e.g. magnetic storage cores, each capable of registering a plurality of data words and the address selection control means are so arranged that the groups of storage elements constituting storage locations having successive address numbers are located in different ones of said blocks or matrices. Thus, for example, in a data storage arrangement providing 8192 separate word storage locations, eight separate blocks or matrices each accommodating 1024 words may be employed and the group of storage elements constituting address 0 arranged in the first block, those of address 1 in the second block, those of address 2 in the third block, those of address 3 in the fourth block, those of address 4 in the fifth block, those of address 5 in the sixth block, those of address 6 in the seventh block, those of address 7 in the eighth block, those of address 8 in the first block again and so on. In an alternative and operationally preferable arrangement providing the same 8192 word storage capacity in eight blocks or matrices each accommodating 1024 words, the groups of storage elements constituting the even numbered addresses 0, 2 . . . . 2046 are arranged in the first block, those of the odd numbered addresses 1, 3 . . . . 2047 are arranged in the second block, those of even numbered addresses 2048 . . . . 4094 in the third block, those of odd numbered addresses 2049 . . . . 4095 in the fourth block and so on, alternate blocks containing even and odd numbered addresses respectively.

Figure 2:
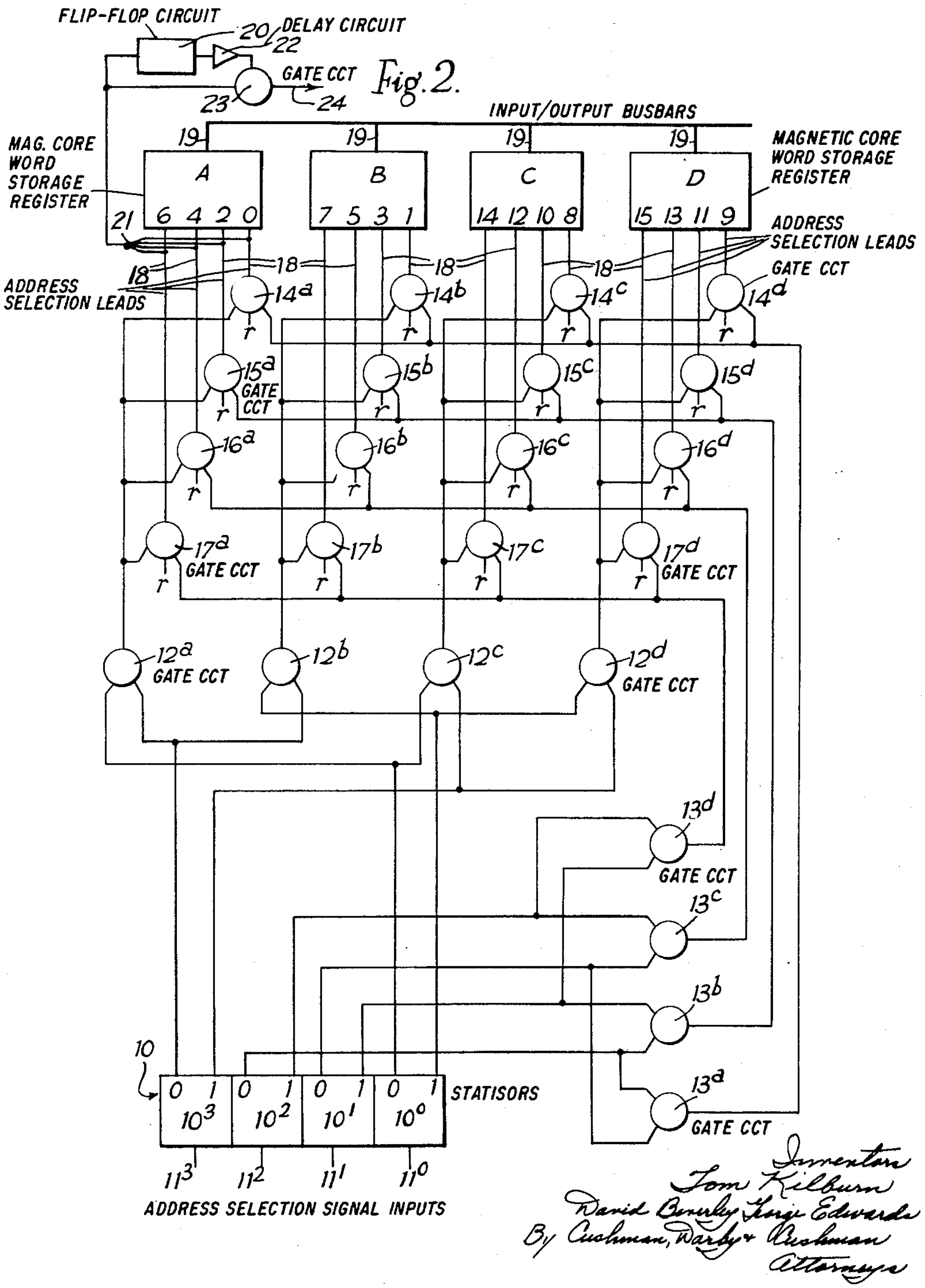

In order that the nature of the invention may be more readily understood, two very simple examples will now be described by way of illustrative example and with reference to the accompanying drawings, in which:

FIGURE 1 is a block schematic diagram of a first data word storage arrangement in accordance with the invention, while FIGURE 2 is a block schematic diagram, similar to FIGURE 1, of an alternative data word storage arrangement also in accordance with the invention.

Each of the examples illustrated and about to be described has purposely been simplified so as to deal with only sixteen separate data word storage locations or addresses distributed among four separate blocks or matrices of storage elements but the manner of extension of the arrangement to accommodate the usual, much larger, numbers of storage locations will be obvious to those skilled in the art. The described examples utilise, as individual digit storage elements, magnetic storage cores of any convenient and now well known form, for example, rings of ferrite material having a hysteresis characteristic of so-called "square loop" form, but it will be understood that the basic features of the invention are more widely applicable and are of utility and advantage with many other forms of storage element which require a recovery period following use which is greater than the minimum period existing between two possible and sequential demands for access thereto.

In the arrangement shown in FIG. 1, A, B, C and D each represent a block or matrix arrangement of magnetic storage cores with their associated windings. Each matrix block is assumed to provide for the registration of four data words, e.g. each of 40 digits length and the word signal input to or output from each matrix block is indicated as being by way of busbars 19. The particular form of each matrix block is immaterial to an understanding of the invention. It may be arranged for either serial or parallel mode operation and may be of any suitable known form of construction. The method of controlling selection of the group of cores constituting a required word storage address is likewise irrelevant to the invention as is also the particular method of effecting reading or writing. For simplicity it will be assumed that energisation of any one address lead 18 by a control signal *r* will effect a required reading or writing operation with the particular group of storage cores related to such address lead.

The particular storage location address numbers allotted to the respective word locations of each matrix block are shown against each address lead 18. Thus address 0 is in block A, address 1 is in block B, address 2 is in block C, address 3 is in block D, address 4 is in block A again and so on sequentially and in the same regular order.

With the simple 16 separate addresses of the embodiment shown, only four binary digits will be required to define uniquely any particular one of the available word storage locations and these four address digits, present in each order for defining the particular required storage address, are assumed for the purpose of easy explanation to be staticised by a four-stage staticisor 10, the inputs being shown as of parallel form on leads $\mathbf{11}^0$, $\mathbf{11}^1$, $\mathbf{11}^2$ and $\mathbf{11}^3$ to each staticisor stage $\mathbf{10}^0$, $\mathbf{10}^1$, $\mathbf{10}^2$ and $\mathbf{10}^3$ but clearly serial form operation is equally possible. The staticisor 10 may comprise, in well known manner, a group of two-stable-state trigger circuits which can be set either into a first "0" state or into a second or "1" state, each trigger circuit providing two alternative "0" and "1" state outputs in accordance with the state into which it is set. Thus when any trigger circuit is in its "0" state, its "0" output may provide a chosen potential or current while the "1" output thereof provides either zero potential or current or some other value different from that provided by the "0" output. With the trigger circuit reversed to its "1" state, the "1" output thereof now provides said chosen potential or current while the "0" output provides zero potential or current or said other and different value potential or current. In many instances of parallel mode operation, the address digit signals are available as sustained voltages or currents and in such cases the trigger circuits or other form of staticisor may not be needed, the said address digit signals themselves providing the requisite "1" state version and the anti-phase "0" state version being derived therefrom through inverter means.

Each address lead 18 of matrix block A includes a coincidence or AND gate $14^a$, $15^a$, $16^a$, $17^a$ having three controlling inputs, one of which is supplied with a control signal *r*, another is derived from the signal output of a further coincidence gate $12^a$ and the third is supplied from one of a series of four further coincidence gates $13^a$, $13^b$ and $13^c$ and $13^d$ respectively. The address leads 18 of blocks B, C and D similarly include coincidence gates $14^b$–$17^b$, $14^c$–$17^c$ and $14^d$–$17^d$ respectively, each having the aforesaid control signal *r* as one input. The control signal *r* may comprise a single pulse or a series of pulses of a duration suited to the required reading or writing operation and time controlled with respect to the associated computing or like machine to coincide with the required instants of reading from or writing into the store in well known manner. Coincidence or AND gates $14^b$, $14^c$ and $14^d$ are also controlled, in parallel with gate $14^a$, by the output of gate $13^a$ and, in similar manner, the groups of further gates $15^b$–$15^d$, $16^b$–$16^d$ and $17^b$–$17^d$ are controlled by the outputs of gates $13^b$, $13^c$ and $13^d$ respectively.

The group of gates $14^b$, $15^b$, $16^b$ and $17^b$ have their remaining control input supplied from gate $12^b$, the group of gates $14^c$, $15^c$, $16^c$ and $17^c$ from gate $12^c$ and the group of gates $14^d$, $15^d$, $16^d$ and $17^d$ from gate $12^d$.

Gates $12^a$, $12^b$, $12^c$ and $12^d$ are controlled by the two least significant address digits staticised in staticisor stages $10^0$, $10^1$ whereby gate $12^a$ provides an output for the digit values 00 of the two least significant address digits whereas gate $12^b$ provides an output only for the values 01 of the same digits and gate $12^c$ an output only for the digit values 10 while gate $12^d$ provides an output only for the digit values 11.

Gates $13^a$, $13^b$, $13^c$ and $13^d$ are controlled in similar manner by the two most significant address digits staticised in staticisor stages $10^2$, $10^3$ whereby gate $13^a$ provides an output only for the most significant digit values 00, gate $13^b$ an output for the digit values 01, gate $13^c$ an output for the digit values 10 and gate $13^d$ an output for the digit values 11.

Thus, in operation, if a series of applied address signals define a series of sequential address numbers, the related groups of storage cores selected for successive use will be located in different successive matrix blocks. For example, a first address signal 0100 (address 4) will stimulate gates $12^a$ and $13^b$ and will therefore open gate $15^a$ to admit the control signal *r* to block A. The next sequential addres signal 0101 (address 5) will stimulate gates $12^b$ and $13^b$ and will therefore open gate $15^b$ to admit the control signal *r* to block B. Similarly, further sequential address signals 0110 (address 6) and 0111 (address 7) will provide access to matrix blocks C and D respectively. Each matrix block is accordingly used only once in each group of four successive address number signals and the resultant minimum permissible access time to the store as a whole is reduced by a factor of 4, e.g. to 0.5 microsecond if each matrix block has an immobilisation time of 2 microseconds.

Under operational conditions, a regular sequence of successive address signals such as 0, 1, 2, 3 . . . . may well not be encountered except perhaps in connection with the successive order signals of a computing programme and even then certain orders, such as those of the conditional transfer type, will break the routine at frequent intervals. In order to provide for a possible need to obtain access successively to two storage locations which are each in the same matrix block, means are provided for generating a "busy" signal associated with each storage block lasting for the aforesaid immobilisation period of, say, 2 microseconds following each instant of use of an address in such matrix block. This busy signal is arranged to be used as an inhibiting signal in the control system of the machine to prevent the next address selection operation taking place if it is in the same storage block until an appropriate recovery time has elapsed, the machine operation then having a corresponding delay imposed thereon.

One arrangement for providing such "busy" or inhibit signal is illustrated for the matrix block A in FIG. 1 and comprises a flip-flop or mono-stable trigger circuit 20 having its triggering input supplied by way of a buffer or OR gate 21 from each of the address leads 18 of the matrix block A. The output lead of the flip-flop 20 is connected by way of a delay circuit 22 to the controlling input of a coincidence gate circuit 23 whose other signal input is supplied also from the buffer 21.

The flip-flop 20 is triggered on whenever any one of the address leads 18 for matrix block A becomes energised consequent upon the use of a storage location therein. The resultant output from the flip-flop 20 then conditions the gate 23 to become open but only after a delay time period imposed by the delay circuit 22. The latter is chosen to be of such value that the gate 23 is not opened until after the active period of the control signal *r* has terminated so that, with each single use of the block A, no inhibit signal can appear on lead 24. The relaxation period of the flip-flop 20 is chosen so that, in combination with the delay circuit 22, the controlling input to gate 23 ceases at the end of the particular immobilisation time. Further use of the matrix block A after the end of such period merely causes a repetition of the operation so far described. If, however, a further address signal appears on any one of the leads 18 of matrix block A before the controlling input supplied by the flip-flop 20 to gate 23 has ceased, then such further signal passes through the opened gate 23 and appears on lead 24 as an inhibit signal which is used to hold up the normal cycle of operations in the control system. It will be understood that each of the other matrix blocks B, C, and D is provided with similar arrangements, the various output leads 24 being taken to a common inhibit circuit of the control system.

FIG. 2 illustrates in a simple form equivalent to FIG. 1 the rearrangement according to a second and preferred form of the invention in which a first group of sequential even-numbered addresses 0, 2, 4 and 6 are disposed in block A, a first group of sequential odd-numbered addresses 1, 3, 5 and 7 are disposed in block B, a second group of sequential even-numbered addresses 8, 10, 12 and 14 are disposed in block C and a second group of sequential odd-numbered addresses 9, 11, 13 and 15 are located in block D. Corresponding elements have been given similar reference characters to those of FIG. 1 and the manner of operation will be self-evident. A "busy" signal is provided in this embodiment as in the previous arrangement of FIG. 1. This modified arrangement has the advantage, particularly when more than four matrix blocks are employed, that orders or instructions of a computing programme can be concentrated in two of the blocks, for instance, in blocks A and B, and the remaining matrix blocks used exclusively or almost exclusively for number word storage. This not only reduces the likelihood of successively required addresses being located within the same block but also facilitates the change of the contents of the different blocks by means of block transfers to and from a subsidiary or backing store.

It will be apparent that many different ways of arranging for the required successful use of different matrix blocks are possible, the choice being governed to a large extent by the type and arrangement of the blocks themselves. By increasing the number of blocks available, the effective access time may obviously be further reduced. For example, if sixteen matrix blocks are provided and arranged in the manner described, then if the immobilization time for each block is 2 microseconds, the minimum reading or writing time could be reduced to 0.125 microsecond.

We claim:

1. A data word storage arrangement for an electronic digital computing machine, said data word storage arrangement comprising a plurality of separate multiple-word storage devices, each of said devices including a plurality of separate data word storage locations, signal input/output connections, and signal-controlled address selection means for rendering any chosen one of said word storage locations accessible through said input/output connections, address selection control means having an address signal input for receiving a digital form address number signal defining any chosen one of said data word storage locations in said storage arrangement and control signal outputs selectively energisable in accordance with the address number defined by the address signal applied to said address signal input, and circuit means interconnecting said control signal outputs of said address selection control means with said address selection means of said word storage devices to render a word storage location in one of said multiple word storage devices accessible through said input/output connections in response to a first address number signal, to render a word storage location in a different one of said multiple word storage devices accessible through said input/output connections in response to a second address number signal having an address number consecutive to the address number of said first address number signal, and to render a word storage location in still another of said multiple word storage devices accessible through said input/output connections in response to a third address number signal having an address number consecutive to the address number of said second address number signal, said circuit means operative to render a multiple word storage device accessible before the completion of an access operation at a previously addressed multiple word storage device.

2. A data word storage arrangement for an electronic digital computing machine, said data word storage arrangement comprising first, second, third and fourth separate multiple word storage devices, each of said devices including a plurality of separate data word storage location, signal input/output connections common to each of said storage devices, signal-controlled address selection means for rendering any chosen one of said word storage locations accessible through said input/output connections, address selection control means having an address signal input for receiving a digital form address number signal defining any chosen one of said data word storage locations in said storage arrangement and control signal outputs selectively energisable in accordance with the address number defined by the addess signal applied to said address signal input, and circuit means interconnecting said control signal outputs of said address selection control with said address selection means of said word storage devices to render a word storage location in said first word storage device accessible through said input/output connections in response to a first address number signal, a word storage location in said second word storage device accessible through said input/output connections in response to a second address number signal having an address number consecutive to the address number of said first address number signal, a word storage location in said third word storage device accessible through said input/output connections in response to a third address number signal having an address number consecutive to the address number of said second address number signal and a word storage location in said fourth word storage device accessible through said input/output connections in response to a fourth address number signal having an address number consecutive to the address number of said third address number signal, said circuit means operating to render a subsequently addressed word storage device accessible prior to the completion of an access operation at a previously addressed multiple word storage device.

3. A data word storage arrangement for an electronic digital computing machine, said data word storage arrangement comprising a plurality of separate magnetic core storage matrices, each of said matrices including a plurality of separate data word storage locations, signal input/output connections, and signal controlled address selection means for rendering any chosen one of said word storage locations accessible through said input/output connections, address selection control means having an address signal input for receiving a digital form address number signal defining any chosen one of said data word storage locations in said storage arrangement and control signal outputs selectively energisable in accordance with the address number defined by the address signal applied to said address signal input, and circuit means interconnecting said control signal outputs of said address selection control means with said address selection means of said magnetic core storage matrices to render a word storage location in one of said matrices accessible through said input/output connections in response to a first address number signal, to render a word storage location in a different one of said matrices accessible through said input/output connections in response to a second address number signal having an address number consecutive to the address number of said first address number signal, and to render a word storage location in still a different one of said matrices accessible through said input/output connections in response to a third address number signal having an address number consecutive to the address number of said second address number signal, said circuit means operating to render accessible a subsequently addressed magnetic core storage matrix prior to the completion of an access operation at a previously addressed magnetic core storage matrix.

References Cited by the Examiner

UNITED STATES PATENTS

| | | | |
|---|---|---|---|
| 2,740,949 | 4/1956 | Counihan | 340—174 |
| 2,992,409 | 7/1961 | Lawrence | 340—166 |
| 3,003,137 | 10/1961 | Kirhjian | 340—174 |
| 3,007,141 | 10/1961 | Rising et al. | 340—174 |
| 3,008,129 | 11/1961 | Katz | 340—174 |
| 3,108,257 | 10/1963 | Buchholz | 340—174 |

OTHER REFERENCES

Smith and Campbell, Automatic Telephony, pages 57–60, 1914 and 1921.

IRVING L. SRAGOW, *Primary Examiner.*

JOHN F. BURNS, *Examiner.*